(12) United States Patent
Fetch

(10) Patent No.: US 7,540,545 B1
(45) Date of Patent: Jun. 2, 2009

(54) VEHICLE-TO-VEHICLE GRASPING APPARATUS

(76) Inventor: Rene H. Fetch, P.O. Box 400, Bismarck, ND (US) 58502-0400

( * ) Notice: Subject to any disclaimer, the term of this patent is extended or adjusted under 35 U.S.C. 154(b) by 87 days.

(21) Appl. No.: 11/811,422

(22) Filed: Jun. 11, 2007

(51) Int. Cl.
*B25J 15/02* (2006.01)
(52) U.S. Cl. .......................................... 294/88; 294/106
(58) Field of Classification Search ................. 294/88, 294/106, 115, 902, 904; 414/23, 739; 280/505, 280/508, 509
See application file for complete search history.

(56) References Cited

U.S. PATENT DOCUMENTS

| | | | | | |
|---|---|---|---|---|---|
| 2,107,312 | A | * | 2/1938 | Thompson | 280/451 |
| 2,157,612 | A | * | 5/1939 | Kirk | 280/505 |
| 3,198,568 | A | * | 8/1965 | Mindrum | 294/88 |
| 4,304,433 | A | * | 12/1981 | Langowski | 294/106 |
| 5,284,375 | A | * | 2/1994 | Land, III | 294/88 |
| 5,839,759 | A | * | 11/1998 | Trigo | 280/762 |
| 7,168,906 | B2 | * | 1/2007 | Weatherford | 414/462 |

* cited by examiner

*Primary Examiner*—Dean J Kramer

(57) ABSTRACT

A vehicle-to-vehicle grasping device which utilizes a pair of top and bottom clamp fingers to grasp the back end of a fleeing vehicle. The clamp fingers are opened and closed through the use of an actuator cylinder and rod. The grasping apparatus is rotatably connected to the front end of a motor vehicle. When not in use, the grasping apparatus lies parallel to the vehicle's front bumper. When a fleeing vehicle is to be stopped, the chase vehicle operator would cause the grasping apparatus to be rotated so that the clamp fingers and related elements of the grasping apparatus are at a right angle to the chase vehicle's front bumper. Once within reach of the fleeing vehicle, the chase vehicle operator engages the actuator cylinder and rod to cause the clamp fingers to close upon the fleeing vehicle's rear bumper or trunk. By applying the chase vehicle's brakes, the fleeing vehicle will be sufficiently slowed or stopped.

7 Claims, 5 Drawing Sheets

VEHICLE-TO-VEHICLE GRASPING APPARATUS

BACKGROUND OF THE INVENTION

1. Field of the Invention

The present invention relates generally to vehicle stopping apparatuses, and more specifically to devices for remotely preventing car movement.

2. Description of Related Art

High-speed vehicular police chases of criminal suspects happen on a daily basis and can, needless to say, result in harm to innocent bystanders, especially in densely populated urban areas. For this reason and for the sake of apprehending a fleeing criminal, it is highly desirable to stop such chases before unnecessary harm can result. Because a police car chasing a criminal suspect's vehicle is typically directly behind the chased vehicle, an effective device for stopping the suspect's vehicle must operate remotely from that vehicle.

What is needed is a device that will accurately and effectively disable a fleeing vehicle. The device should be usable regardless of the path that the fleeing vehicle takes. Numerous efforts have been made in these regards, yet nothing prior to the present invention meets the clear need for a device for disabling a fleeing vehicle.

U.S. Pat. No. 2,353,386, issued on Jul. 11, 1944, to Charles D. Bourcier, describes a device for deflating pneumatic tires. The device acts by passively providing a conduit between the inside space of such a tire and the environment. U.S. Pat. No. 4,055,104, issued on Oct. 25, 1977, to Irving B. Osofsky et al., describes a tire-piercing device which is intended to be imbedded in a paved surface. U.S. Pat. No. 4,382,714, issued on May 10, 1983, to Walter G. Hutchison, describes a passive device for deflating pneumatic tires by providing a conduit between the inside space of such a tire and the environment. The device may be interconnected with similar devices, which are together placed on pavement where a vehicle is expected to pass. U.S. Pat. No. 4,995,756, issued on Feb. 26, 1991, to Donald C. Kilgrow et al., describes a tire deflator with a supporting base that supports and then releases puncturing conduits once such conduits are imbedded in tires. U.S. Pat. No. 5,243,894, issued on Sep. 14, 1993, to Michael A. Minovitch, describes a blinding light intended to immobilize assailants. The light is not used to guide or aim a projectile. U.S. Pat. No. 5,253,950, issued on Oct. 19, 1993, to Donald C. Kilgrow et al., describes a foldable tire deflator. There is no projectile and no laser aiming or guiding. U.S. Pat. No. 5,328,292, issued on Jul. 12, 1994, to Francis R. Williams, describes a tire-puncturing traffic barrier chain. U.S. Pat. No. 5,330,285, issued on Jul. 19, 1994, to Kenneth J. Greves et al., describes an apparatus for deflating tires that is collapsible. It is to be placed in front of cars.

All of the above patents are drawn to devices useful for deflating tires of a vehicle. Upon deflation of the tires, the driver no longer retains control of the vehicle, thereby possibly subjecting both law enforcement officers and bystanders to serious injury from the uncontrollable vehicle. Moreover, the rate of success for a tire deflation apparatus is relatively low. Furthermore, the law enforcement officer typically possess once such tire deflation apparatus. Thus, if the law enforcement officer is not given a second chance if not successful on the first attempt.

Accordingly, it is the primary object of the present invention to provide an apparatus which allows law enforcement officers to safely slow down a chased vehicle and to bring the chased vehicle to a stop without endangering citizens or their property. Furthermore, with the present invention, if a law enforcement officer is not successful in disabling the chased vehicle on his first attempt, he continue to utilize the apparatus until the chased vehicle has been safely stopped.

SUMMARY OF THE INVENTION

By the present invention, a vehicle grasping apparatus such as a grapple for grasping irregularly shaped objects, such as a bumper. The grapple includes a pair of spaced, opposed gripping fingers which gripping fingers can be pivoted together to grasp and hold an object or objects within the region. Likewise, the gripping fingers can be pivoted to open the grasping region to release an object from the grip of the grapple unit. The grapple unit is fixedly attached to the front frame of a vehicle.

It is, therefore, an object of the present invention to provide a grasping apparatus for use in grasping one vehicle from a following or trailing vehicle.

It is another object of the present invention to provide a grasping apparatus which can be adapted to positively grip an object of irregular size or shape without causing a misgrip.

It is another object of the invention to provide a means for disabling a chased vehicle while maintaining control of the chased vehicle.

It is another object of the invention to provide a grasping apparatus which can be easily installed on existing law enforcement vehicles.

Still another object of the invention is to prevent harm to innocent bystanders as a result of a high-speed vehicle chase.

It is an object of the invention to provide improved elements and arrangements thereof in an apparatus for the purposes described which is inexpensive, dependable and fully effective in accomplishing its intended purposes.

These, and other, aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made without the scope of the present invention without departing from the spirit thereof, and the invention includes all such modifications.

DESCRIPTION OF THE PREFERRED EMBODIMENTS

Figure 1:
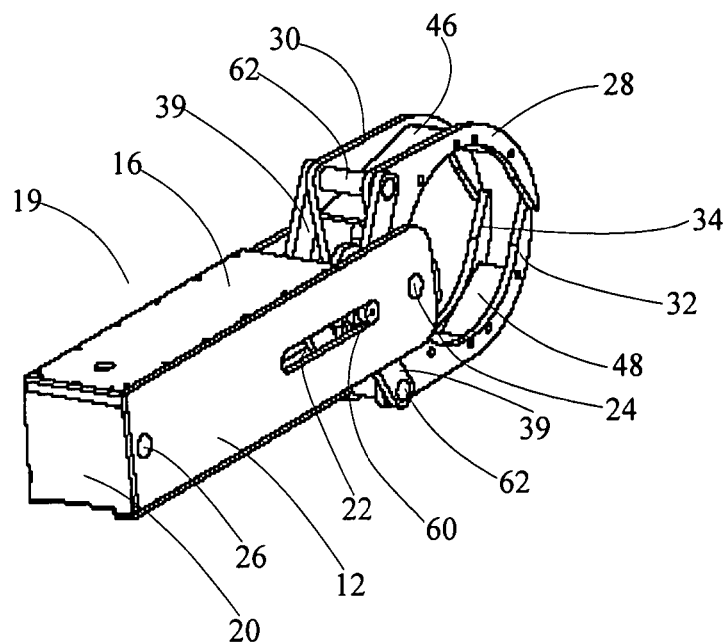
FIG. 1 is a side perspective view of the vehicle-to-vehicle grasping apparatus with the clamp fingers in the closed or grasping position.

When high-speed automobile chases occur, there is a risk of harm to innocent bystanders stemming from reckless driving. Moreover, the chased automobile in such a chase must be stopped to apprehend the fleeing driver. For these reasons, it is highly desirable to provide a device that law enforcement officials can use to stop a chased automobile, while it is being chased. Because a path of a chased vehicle cannot generally be predicted, a mere stationary blockade cannot provide the desired effect of stopping a chased automobile. Instead, the present invention provides a device which law enforcement can utilize to slow down or stop a chased vehicle at a location deemed appropriate by the law enforcement officer.

The present invention and the various features and advantageous details thereof are explained more fully with reference to the non-limiting embodiments described in the following description.

Reference is now made to FIGS. 1 to 7, the grasping apparatus is comprised of a first side plate 12, a second side plate 14, a top plate 16 and a bottom plate 18. The edges of the top plate 16 and bottom plate 18 are removably attached to the edges of the first side plate 12 and second side plate 14, thereby taking the form of a rectangular box 19 having a first open end 21 and a second open end 23. The first open end 21 is covered by an end plate 20 with the edges of the end plate 20 being attached to the respective proximal ends of the side plates 12, 14, top plate 16 and bottom plate 18. A long and narrow opening 22 is formed on the surface of the side plates 12 and 14. Adjacent to the proximal ends of the side plates 12, 14 is a first circular opening 24 and a second circular opening 26.

Figure 2:
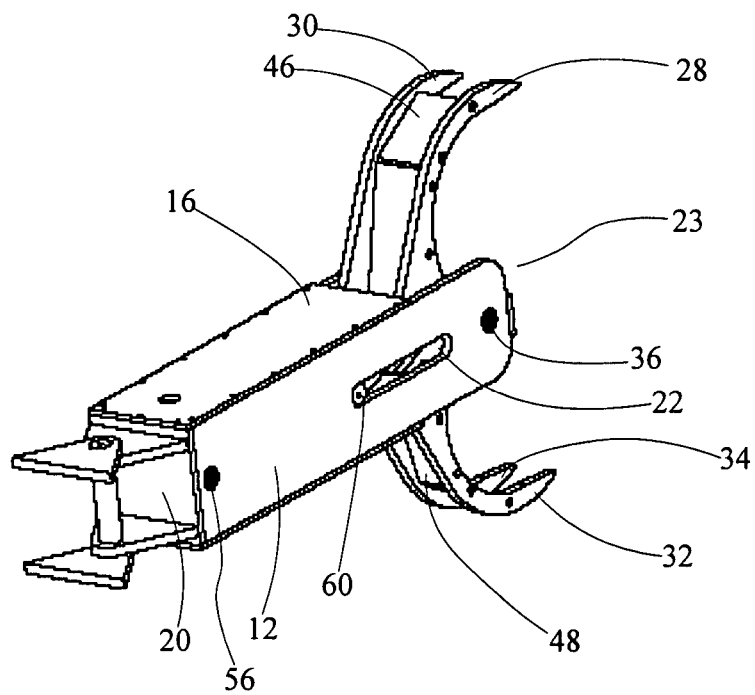
FIG. 2 is a side perspective view of the vehicle-to-vehicle grasping apparatus with the clamp fingers in the open position.
Figure 3:
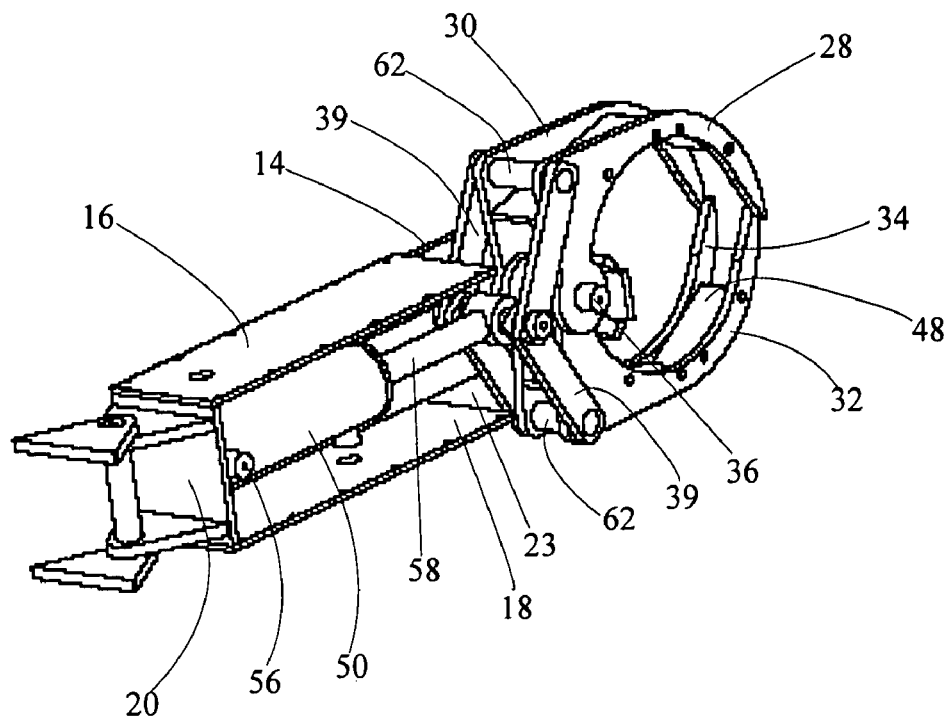
FIG. 3 is a perspective view of the vehicle-to-vehicle grasping apparatus with the sides plates removed and the hydraulic cylinder and cylinder rod visible.

Referring to FIGS. 1, 2 and 3, in the preferred embodiment of the present invention, the gripping device consists of a first top clamp finger 28, a second top clamp finger 30, a first bottom clamp finger 32 and a second bottom clamp finger 34. In an alternative embodiment of the present invention, a single top clamp finger is used with two bottom clamp fingers.

Figure 5:
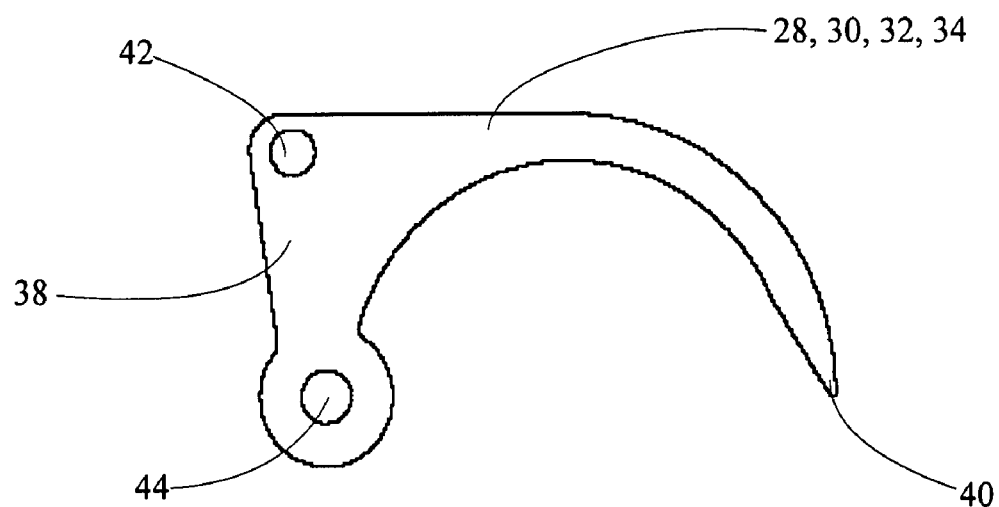
FIG. 5 is a side perspective view of a clamp finger of the vehicle-to-vehicle grasping apparatus.
Figure 6:
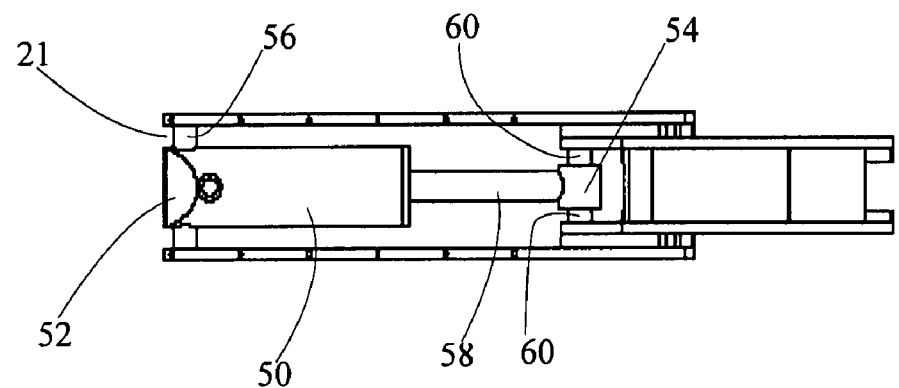
FIG. 6 is a top perspective view of the vehicle-to-vehicle grasping apparatus.

Referring to FIG. 5, each clamp finger 28, 30, 32 and 34 is preferably an arcuate member that extends from a first end 38 adapted to be connected to a pivot pin 36 and a mechanical link 39 to a second end 40 defining the tip of the finger. The first end 38 of each clamp finger 28, 30, 32 and 34 contains a first clamp finger opening 42 and a second clamp finger opening 44.

Figure 4:
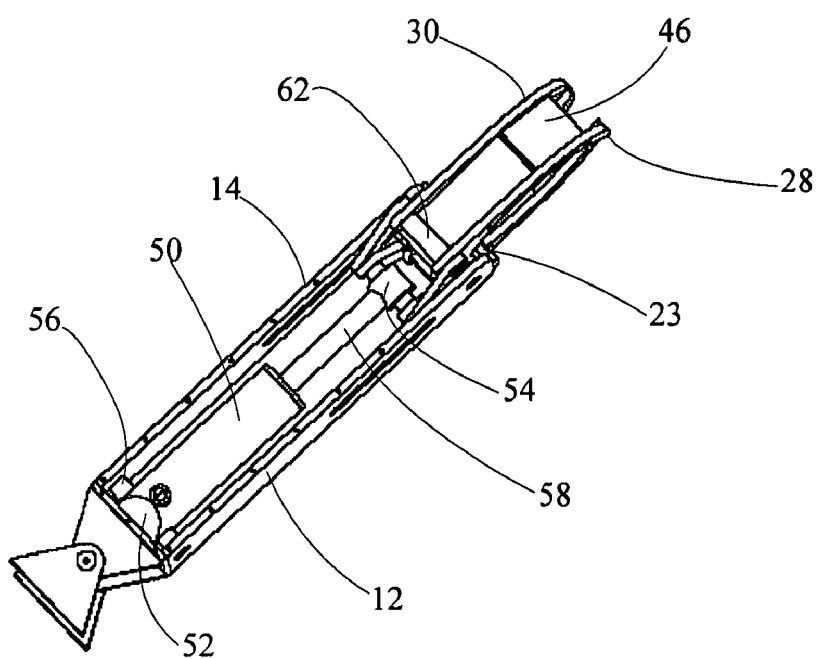
FIG. 4 is a perspective view of the vehicle-to-vehicle grasping apparatus with the top and bottom plates removed and the hydraulic cylinder and cylinder rod visible.

Referring to FIG. 4, fixedly attached to the inside edges of the first top clamp finger 28 and the second top clamp finger 30 so as to maintain a desired distance between the top clamp fingers 28, 30 is a top rectangular plate 46. Likewise, fixedly attached to the inside edges of the first bottom clamp finger 32 and the second bottom clamp finger 34 so as to maintain a desired distance between the bottom clamp fingers 32, 34 is a bottom rectangular plate 48. The top rectangular plate 46 fixedly attached to the top clamp fingers 28, 30 is narrower than the rectangular plate 48 fixedly attached to the bottom clamp fingers 32, 34, thereby allowing the tips of the top clamp fingers 28, 30 to overlap the tips of the bottom clamp fingers 32, 34 when the gripping device is in a closed position.

The gripping device is attached to the rectangular box 19 by inserting the first end 38 of the clamp fingers 28, 30, 32, 34 into the second open end 23 of the rectangular box 19. The second clamp finger openings 44 of the clamp fingers 28, 30, 32, 34 are aligned with the first circular openings 24 of the first and second side plates 12, 14. A pivot pin 36 is inserted through the second clamp finger openings 44 and first circular openings 24 allowing the clamp fingers 28, 30, 32, 34 to rotate about the pivot pin 36.

The grasping apparatus further includes a hydraulic cylinder or pneumatic actuator 50 maintained within the rectangular box 19. The first end 52 of the hydraulic cylinder 50 is removably attached near the end plate 20 by means of a pivot pin 56 maintained in the second circular openings 26 of the first and second side plates 12, 14. The second end 54 of the hydraulic cylinder 50 is found at the distal end of the cylinder rod 58 with said second end 54 having a cylindrical opening.

Figure 7:
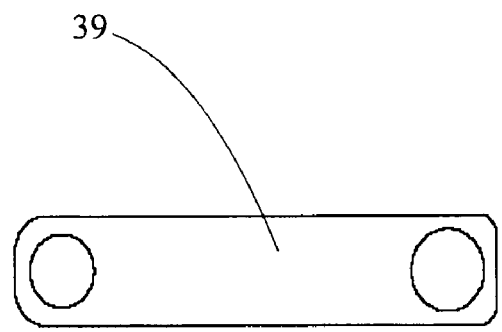
FIG. 7 is a top perspective view of the mechanical link of the vehicle-to-vehicle grasping apparatus.

To connect the hydraulic cylinder 50 to the clamp fingers 28, 30, 32, 34 an elongated pivot pin 60 is inserted within the cylindrical opening of the second end 54 of the hydraulic cylinder 50. Abutting each side of the second end 54 of the hydraulic cylinder 50 are a pair of mechanical links 39. Referring to FIG. 7, the mechanical links 39 have a first end and a second end with circular openings adjacent to each end.

Figure 8:
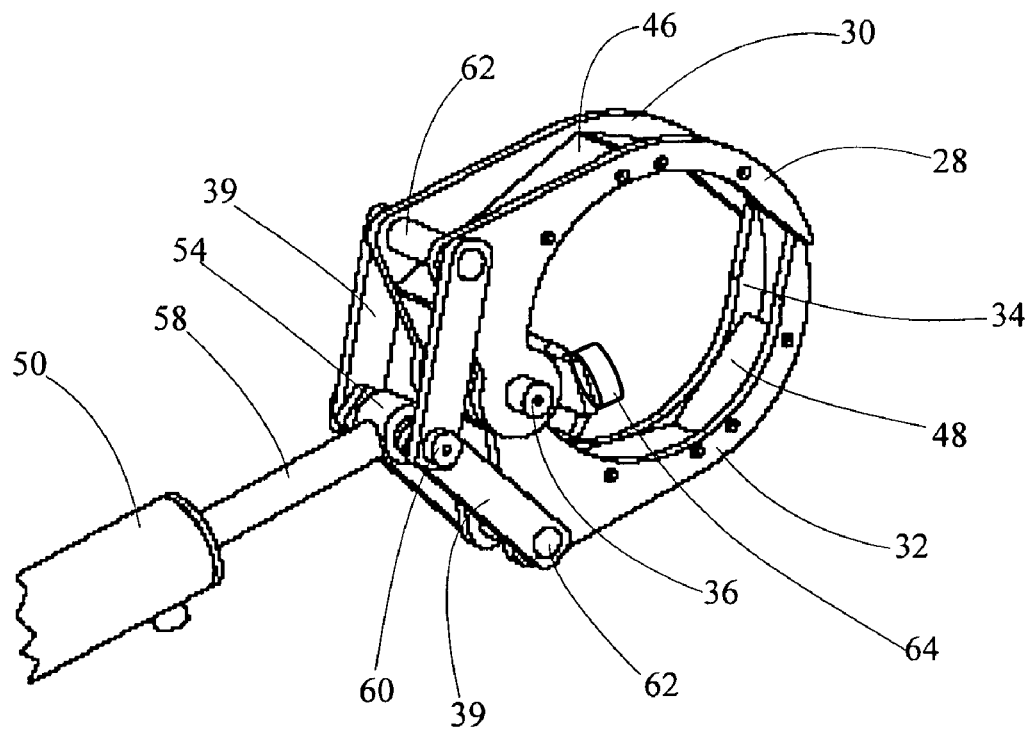
FIG. 8 is a side perspective view of the mechanical links, pivot pins and clamp fingers of the vehicle-to-vehicle grasping apparatus.

Referring to FIG. 8, the circular opening near the first end of the mechanical links 39 are rotatably attached at the first clamp finger openings 42 of the clamp fingers 28, 30, 32, 34 with a pivot pin 62. The circular opening near the second end of the mechanical links 39 rotates about the elongated pivot pin 60 at the second end 54 of the hydraulic cylinder 50. As illustrated in FIGS. 1 and 2, the elongated pivot pin 60 projects through the long and narrow opening 22 of the first and second side plates 12, 14 allowing the elongated pivot pin 60 and attached mechanical links 39 to be slidably engaged when the cylinder rod 58 is extended or retracted.

To engage the clamp fingers 28, 30, 32, 34, to enable the gripping device to attach to another vehicle, the law enforcement officer simply extends the cylinder rod 58 of the hydraulic cylinder 50 through a remote control device (not shown). The cylinder rod 58 is extended in a forward direction causing the elongated pivot pin 60 to slide forward in the long and narrow opening 22 of the first and second side plates 12, 14. As the elongated pivot pin 60 slides forward, the attached mechanical links 39 also move forward and upward causing the clamp fingers 28, 30, 32, 34, to rotate about the pivot pins 36, 62 as are their respective fulcrums, respectively, so that the top clamp fingers 28, 30 and bottom clamp fingers 32, 34 are in a closed position.

In an alternative embodiment of the present invention, the gripping device contains an impact trigger/pressure accumulator 64 which causes the clamp fingers 28, 30, 32 and 34 to close immediately upon contact with the forward vehicle. For safety purposes, a disarming means is incorporated into the impact trigger/pressure accumulator 64.

To open the clamp fingers 28, 30, 32, 34 when in the closed position, the law enforcement officer simply retracts the cylinder rod 58 of the hydraulic cylinder 50 through a remote control device (not shown). When retracting the cylinder rod 58 the elongated pivot pin 60 slides in a backwards direction in the long and narrow opening 22 of the first and second side plates 12, 14. As the elongated pivot pin 60 slides in a backwards direction, the attached mechanical links 39 also move backward causing the clamp fingers 28, 30, 32, 34, to rotate about the pivot pins 36, 62 as are their respective fulcrums, respectively, so that the top clamp fingers 28, 30 and bottom clamp fingers 32, 34 are separated from their respective positions.

Figure 9:
FIG. 9 is a side perspective view of the vehicle-to-vehicle grasping apparatus attached to the front end of vehicle with the clamp fingers in an open position.
Figure 10:
FIG. 10 is a side perspective view of the vehicle-to-vehicle grasping apparatus attached to the front end of vehicle with the clamp fingers in a closed position.

In the preferred embodiment, the grasping apparatus is rotatably connected to the front end of a motor vehicle (See FIGS. 9 and 10). When not in use, the grasping apparatus would lie parallel to the vehicles front bumper. When a law enforcement officer seeks to stop a fleeing vehicle, the law enforcement officer would cause the grasping apparatus to be rotated so that rectangular box 19 and related elements of the grasping apparatus are at a right angle to the vehicles front bumper. The grasping apparatus is rotated to be parallel to the vehicles front bumper and at a right angle to the vehicles front bumper through a hydraulic cylinder or other pneumatic device (not shown).

Although the best mode contemplated by the inventor of carrying out the present invention is disclosed above, practice of the present invention is not limited thereto. It will be manifest that various additions, modifications and rearrangements of the features of the present invention may be made without deviating from the spirit and scope of the underlying inventive concept.

The individual components mentioned herein need not be fabricated from the disclosed materials, but could be fabricated from virtually any suitable and strong materials.

Moreover, the individual components need not be formed in the disclosed shapes, or assembled in the disclosed configuration, but could be provided in virtually any shape, and assembled in virtually any suitable configuration. It is intended that the appended claims cover all such additions, modifications and rearrangements.

Index of Elements for Vehicle-to-Vehicle Grasping Apparatus

12. First Side Plate
14. Second Side Plate
16. Top Plate
18. Bottom Plate
19. Rectangular Box
20. End Plate
21. First Open End
22. Long Narrow Opening
23. Second Open End
24. First Circular Opening
26. Second Circular Opening
28. First Top Clamp Finger
30. Second Top Clamp Finger
32. First Bottom Clamp Finger
34. Second Bottom Clamp Finger
36. Pivot Pin
38. Clamp Finger First End
39. Mechanical Link
40. Clamp Finger Second End
42. First Clamp Finger Opening
44. Second Clamp Finger Opening
46. Top Rectangular Plate
48. Bottom Rectangular Plate
50. Hydraulic Cylinder
52. First End of Hydraulic Cylinder
54. Second End of Hydraulic Cylinder
56. Pivot Pin
58. Hydraulic Cylinder Rod
60. Elongated Pivot Pin
62. Pivot Pin

What is claimed is:

1. A vehicle-to-vehicle grasping apparatus removably attached to the front end of a motor vehicle comprising:
   a first side plate, a second side plate, a top plate, a bottom plate and an end plate which form a rectangular box having an open end;
   a long and narrow opening is formed on the surface of the side plates and circular openings are adjacent to the proximal ends of the side plates;
   a gripping device which is comprised of:
      a first top clamp finger, a second top clamp finger, a first bottom clamp finger, and a second bottom clamp finger with each clamp finger being an arcuate member that extends from a first end adapted with openings to be connected to a pivot pin and a mechanical link to a second end defining the tip of the finger;
      a rectangular plate is fixedly attached to the inside edges of the top clamp fingers and to the inside edges of the bottom clamp fingers so as to maintain a desired distance between the clamp fingers;
   a pivot pin inserted into the aligned openings of the clamp fingers and the side plates;
   a hydraulic cylinder having a cylinder rod with the first end of the hydraulic cylinder removably attached near the end plate by means of a pivot pin inserted in the circular openings of the first and second side plates and the second end of the hydraulic cylinder at the distal end of the cylinder rod having a cylindrical opening;
   a elongated pivot pin which extends into the long and narrow opening of the first and second side plates is inserted into the cylindrical opening of the second end of the hydraulic cylinder along and the first end of a pair of mechanical links; and
   a pivot pin is inserted into the clamp finger openings and the first end of the mechanical links.

2. The apparatus of claim 1 wherein the rectangular plate fixedly attached to the top clamp fingers is narrower than the rectangular plate fixedly attached to the bottom clamp fingers thereby allowing the tips of the top clamp fingers to overlap the tips of the bottom clamp fingers when the gripping device is in a closed position.

3. The apparatus of claim 1 wherein the elongated pivot pin which extends into the long and narrow opening of the first and second side plates is slidable within the long and narrow opening as the hydraulic rod is extended and retracted.

4. A vehicle-to-vehicle grasping apparatus removably attached to the front end of a motor vehicle comprising:
   a first side plate, a second side plate, a top plate, a bottom plate and an end plate which form a rectangular box having an open end;
   a long and narrow opening is formed on the surface of the side plates and circular openings are adjacent to the proximal ends of the side plates;
   a gripping device which is comprised of:
      top clamp fingers and bottom clamp fingers with each clamp finger being an arcuate member that extends from a first end adapted with openings to be connected to pivot pins to a second end defining the tip of the clamp finger;
      a rectangular plate fixedly attached to the inside edges of the top clamp fingers and to the inside edges of the bottom clamp fingers so as to maintain a desired distance between the clamp fingers;
   a pivot pin inserted into the aligned openings of the clamp fingers and the side plates;
   an actuator cylinder having a cylinder rod with the first end of the cylinder removably attached near the end plate by means of a pivot pin inserted in the circular openings of the first and second side plates and the second end of the cylinder at the distal end of the cylinder rod having a cylindrical opening;

a plurality of mechanical links having a first end and a second end with circular openings adjacent to said first end and said second end;

a elongated pivot pin which elongated pivot pin is inserted into the cylindrical opening of the second end of the cylinder and the cylindrical opening adjacent to the first end of the mechanical links which elongated pivot pin extends into the long and narrow opening of the first and second side plates; and a pivot pin which pivot pin is inserted into the clamp finger openings and the cylindrical opening adjacent to the second end of the mechanical links.

5. The apparatus of claim 4 wherein the actuator cylinder is a pneumatic device, that can be utilized to move the clamp fingers to an open position and a closed position.

6. The apparatus of claim 4 wherein the elongated pivot pin which extends into the long and narrow opening of the first and second side plates is slidable within the long and narrow opening as the cylinder rod is extended and retracted.

7. The apparatus of claim 4 wherein the gripping device contains an impact trigger/pressure accumulator which causes the clamp fingers to close immediately upon contact with the forward vehicle.

* * * * *